United States Patent
Bian et al.

(10) Patent No.: US 12,530,889 B2
(45) Date of Patent: Jan. 20, 2026

(54) METHOD FOR PROCESSING VIDEO DATA, ELECTRONIC DEVICE AND COMPUTER STORAGE

(71) Applicant: BEIJING BAIDU NETCOM SCIENCE TECHNOLOGY CO., LTD., Beijing (CN)

(72) Inventors: Donghai Bian, Beijing (CN); Yuwei Wu, Beijing (CN); Guangzhi Sheng, Beijing (CN); Yehan Zheng, Beijing (CN); Weihua Peng, Beijing (CN); Weijian Xu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 470 days.

(21) Appl. No.: 18/084,444

(22) Filed: Dec. 19, 2022

(65) Prior Publication Data
US 2023/0117255 A1    Apr. 20, 2023

(30) Foreign Application Priority Data
Dec. 23, 2021    (CN) .......................... 202111592644.0

(51) Int. Cl.
*G06V 20/40*    (2022.01)
*G06T 7/215*    (2017.01)
(Continued)

(52) U.S. Cl.
CPC .............. *G06V 20/41* (2022.01); *G06T 7/215* (2017.01); *G06T 7/246* (2017.01);
(Continued)

(58) Field of Classification Search
CPC .... G06V 20/41; G06V 10/7715; G06V 10/82; G06V 20/49; G06V 10/62; G06V 20/46;
(Continued)

(56) References Cited

U.S. PATENT DOCUMENTS

2013/0036124 A1* 2/2013 Ambwani ........... G06F 16/7844
                                                             707/E17.059
2017/0177943 A1* 6/2017 Mehrseresht .......... G06V 10/85
(Continued)

FOREIGN PATENT DOCUMENTS

CN    103247318 A    8/2013
CN    103761284 A    4/2014
(Continued)

OTHER PUBLICATIONS

Trung-Nghia Le, & Sugimoto, A. (2017). SpatioTemporal utilization of deep features for video saliency detection. 2017 IEEE International Conference on Multimedia & Expo Workshops (ICMEW), 465-470. https://doi.org/10.1109/ICMEW.2017.8026300 (Year: 2017).*
(Continued)

*Primary Examiner* — Stephen R Koziol
*Assistant Examiner* — Michael Kim Maiden
(74) *Attorney, Agent, or Firm* — Lippes Mathias LLP

(57) ABSTRACT

A method for processing video data includes: acquiring a target segment of video data to be extracted; acquiring theme information to be extracted; and determining an association degree between the target segment and the theme information based on segment information of the video data and a relationship between the target segment and the video data.

20 Claims, 9 Drawing Sheets

(51) Int. Cl.
  *G06T 7/246* (2017.01)
  *G06V 10/77* (2022.01)
  *G06V 10/82* (2022.01)
(52) U.S. Cl.
  CPC ......... *G06V 10/7715* (2022.01); *G06V 10/82* (2022.01); *G06V 20/49* (2022.01)
(58) Field of Classification Search
  CPC ........ G06V 30/18; G06T 7/215; G06T 7/246; G06F 16/7837; G06F 16/7844; G06F 16/786; G06F 16/7867; G06F 16/739; G06N 3/0442; G06N 3/045; G06N 7/01; H04N 21/26603; H04N 21/4828; H04N 21/84; H04N 21/23418
  See application file for complete search history.

(56) References Cited

U.S. PATENT DOCUMENTS

| | | | |
|---|---|---|---|
| 2019/0026291 A1* | 1/2019 | Bhatt | .................... G06F 16/743 |
| 2021/0248376 A1 | 8/2021 | Zhao et al. | |

FOREIGN PATENT DOCUMENTS

| | | | |
|---|---|---|---|
| CN | 107636651 A | | 1/2018 |
| CN | 109101558 A | | 12/2018 |
| CN | 110290397 A | | 9/2019 |
| CN | 110309353 A | | 10/2019 |
| CN | 110753269 A | | 2/2020 |
| CN | 111274995 A | | 6/2020 |
| CN | 111680189 A | | 9/2020 |
| CN | 112004111 A | | 11/2020 |
| CN | 112822506 A | * | 5/2021 |
| CN | 113326767 A | | 8/2021 |
| CN | 113407775 A | | 9/2021 |
| CN | 113449147 A | * | 9/2021 ......... G06F 16/7867 |

OTHER PUBLICATIONS

Office Action for Chinese Application No. 202111592644.0, dated Sep. 30, 2022, 7 pages.
Manjot Bilkhu et al., "Attention is All You Need for Videos: Self-Attention Based Video Summarization Using Universal Transformers", Jun. 6, 2019, 15 pages.
Search Report for European Application No. 22214197.0, dated Apr. 6, 2023, 13 pages.
Arnab, Anurag et al., "ViViT: A Video Vision Transformer"; Mar. 29, 2021, 13 pages.
Sigurdsson, Gunnar A. et al., "Asynchronous Temporal Fields for Action Recognition"; Cornell University Library; Dec. 19, 2016, 20 pages.
Liu, Chenchen et al., "Beyond Short-Term Snippet: Video Relation Detection with Spatio-Temporal Global Context", 2020 IEEE/CVF Conference on Computer Vision and Pattern Recognition (CVPR), Jun. 13, 2020, 10 pages.
Zhang, Ji et al., "Exploiting Mid-Level Semantics for Large-Scale Complex Video Classification"; IEEE Transactions on Multimedia, vol. 21, No. 10; Oct. 1, 2019, 13 pages.
Le, Trung-Nghia et al., "Spatiotemporal Utilization of Deep Features for Video Saliency Detection"; Proceedings of the IEEE International Conference on Multimedia and Expo Workshops (ICMEW): Jul. 10, 2017, 6 pages.
Loukas, Constantinos, "Video Content Analysis of Surgical Procedures"; SSpringer Science+Business Media, LLC; vol. 32, No. 2; Oct. 26, 2017, 16 pages.

* cited by examiner

METHOD FOR PROCESSING VIDEO DATA, ELECTRONIC DEVICE AND COMPUTER STORAGE

CROSS-REFERENCE TO RELATED APPLICATION

This application claims priority to and benefits of Chinese Patent Application No. 202111592644.0, filed on Dec. 23, 2021, the entire content of which is incorporated herein by reference.

FIELD

The present disclosure relates to the field of computer technologies, and specifically to technical fields of natural language processing (NLP), knowledge graph, computer vision, deep learning, and the like.

BACKGROUND

With the development of computer and network technologies, information amount is increasing, the transmission speed is accelerating, and the transmission range is wide. Information overload has become an increasingly serious problem in modern society. Videos, as a kind of fastest-growing information carrier, account for more than 80% of all Internet traffic in recent years. In order to help users rapidly determine their desired video data from a large number of videos, a correlation between a video and a given content needs to be determined.

SUMMARY

A method for processing video data, an electronic device and a computer storage medium are provided in the present disclosure.

According to one aspect of the present disclosure, a method for processing video data is provided. The method includes: acquiring a target segment of video data to be extracted; acquiring theme information to be extracted; and determining an association degree between the target segment and the theme information based on segment information of the video data and a relationship between the target segment and the video data.

According to another aspect of the present disclosure, an electronic device is provided. The electronic device includes: at least one processor; and a memory communicatively connected to the at least one processor, the memory is stored with instructions executable by the at least one processor, and the instructions, when executed by the at least one processor, cause the at least one processor to perform the method as described in any embodiment of the present disclosure.

According to another aspect of the present disclosure, a non-transitory computer readable storage medium is provided. The non-transitory computer readable storage medium has stored therein computer instructions that, when executed by a computer, cause the computer to perform the method as described in any embodiment of the present disclosure.

It should be understood that, the content described in this part is not intended to identify key or important features of embodiments of the present disclosure, nor is it intended to limit the scope of the present disclosure. Other features of the present disclosure will become more readily appreciated from the following descriptions.

BRIEF DESCRIPTION OF THE DRAWINGS

The drawings are intended for a better understanding of the present disclosure, and do not constitute a limitation to the present disclosure.

DETAILED DESCRIPTION

Explanatory embodiments of the present disclosure are described below with reference to the accompanying drawings, which include various details to facilitate understanding of embodiments of the present disclosure, and should be considered as explanatory merely. Therefore, it will be appreciated by those skilled in the art that various changes and modifications may be made to the embodiments described herein without departing from the scope and spirit of the present disclosure. Similarly, for clarity and conciseness, descriptions on well-known functions and structures are omitted in the following.

Figure 1:
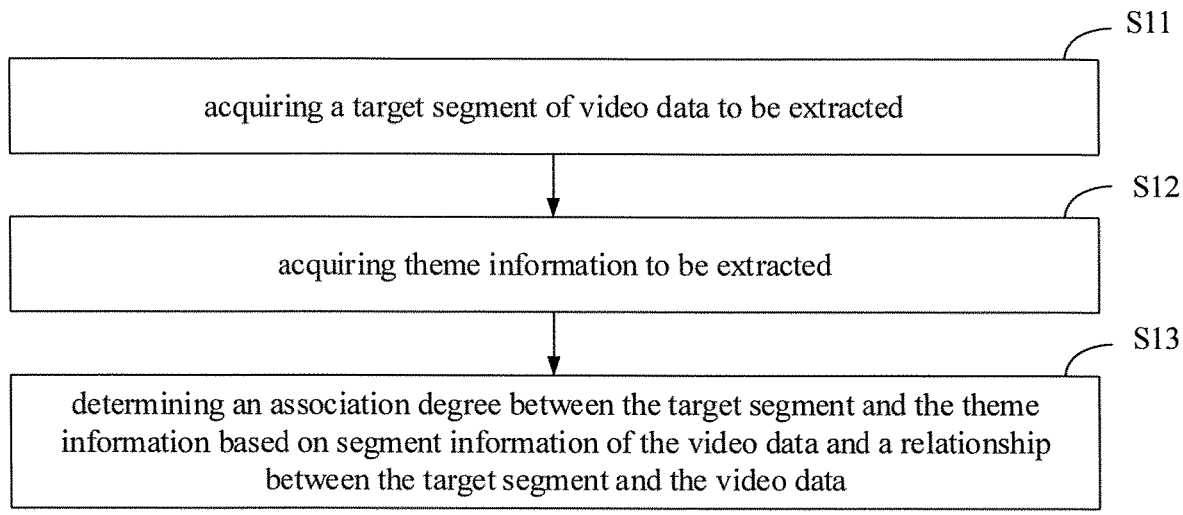
FIG. 1 is a schematic flowchart of a method for processing video data according to an embodiment of the present disclosure.

According to embodiments of the present disclosure, a method for processing video data is provided. FIG. 1 is a schematic flowchart of a method for processing video data according to an embodiment of the present disclosure. The method may be applied to an available front end or an electronic device having an execution instruction, for example, the device may be deployed in a terminal or a server or other processing devices, and perform operations likes acquisition of a target segment and determination of theme information. The terminal may be a user equipment (UE), a mobile device, a cellular phone, a cordless phone, a personal digital assistant (PDA), a handheld device, a computing device, a vehicle-mounted device, a wearable device, etc. In some possible implementations, the method may be achieved by calling a computer readable instruction stored in a memory by a processor. As illustrated in FIG. 1, the method for processing video data includes the following operations as shown in blocks of FIG. 1.

At block S11, a target segment of video data to be extracted is acquired.

At block S12, theme information to be extracted is acquired.

At block S13, an association degree between the target segment and the theme information is determined based on segment information of the video data and a relationship between the target segment and the video data.

The video data to be extracted as described in embodiments of the present disclosure may be data of the target segment associated with the theme information to be extracted. For example, it may be video data of a film video, video data generated by splicing video segments of different contents, or the like.

In embodiments of the present disclosure, the target segment may be a segment in the video data, and its duration may be less than a total duration of the video data. The video data to be extracted includes the target segment.

The theme information to be extracted may be theme information associated with a content of the target segment desired to be extracted, such as a performance segment of an actor A, a fighting segment, a debate segment, an analysis segment, a hunting segment, or the like. Alternatively, the theme information to be extracted may be theme information associated with a type of the target segment desired to be extracted, such as an animation segment, a non-animation segment, a full-length shot segment, an inter-cut segment, or the like.

The theme information to be extracted may be text information, image information, audio information, or video frame information. The content or the type of the target segment to be extracted may be determined by analyzing the theme information to be extracted.

In embodiments of the present disclosure, the segment information of the video data may include a part of the video data. For example, the video data may be divided or split based on a time interval to acquire at least one segment of the video data. The segment information of the video data may further include at least one of: a start/end position or time of a part, i.e., at least one segment, of the video data, specific video frames included in the segment, a percent of the segment to a total length of the video data, and the like.

In a possible implementation, the segment information of the video data may be information of a segment included in the video data, and specifically includes information of at least one video segment including the target segment of the video data, and the target segment may be one of the at least one segment of the video data. The segment information of the video data further may specifically include information of other video segments of the video data in addition to the target segment.

Determining the association degree between the target segment and the theme information based on the segment information of the video data and the relationship between the target segment and the video data may be determining whether the target segment is consistent with the theme information based on the segment information of the video data and an association relationship between the target segment and other segments of the video data.

In another possible implementation, for each segment in the video data, it may be taken as the target segment in sequence, and an association degree between the segment and the theme information may be determined, so that a segment most associated with given theme information may be determined based on the association degree between each segment and the theme information.

In embodiments of the present disclosure, at least one of the operations as illustrated in blocks S11 to S13 may be executed by a model.

In embodiments of the present disclosure, the association degree between the target segment of the video data and the theme information can be determined, so that it can be determined that the target segment is highly associated with the theme information in response to the target segment being highly consistent with the theme information, thereby determining theme information of the target segment or determining a segment from the video data as the target segment consistent with the theme information.

Figure 2:
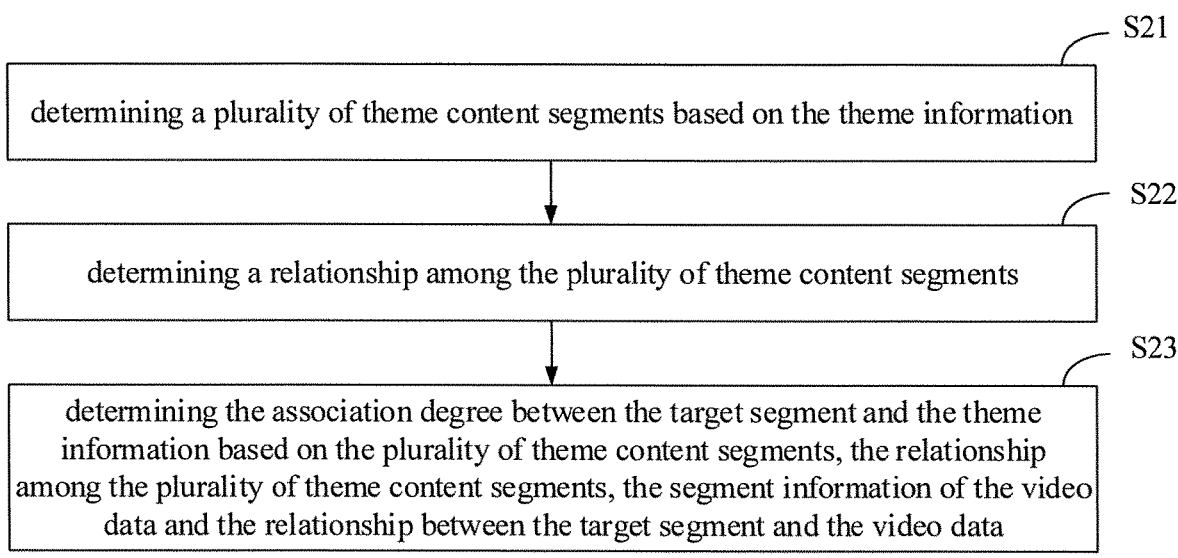
FIG. 2 is a schematic flowchart of a method for processing video data according to an embodiment of the present disclosure.

In an implementation, determining the association degree between the target segment and the theme information based on the segment information of the video data and the relationship between the target segment and the video data includes operations as illustrated in blocks of FIG. 2.

At block S21, a plurality of theme content segments are determined based on the theme information.

At block S22, a relationship among the plurality of theme content segments is determined.

At block S23, the association degree between the target segment and the theme information is determined based on the plurality of theme content segments, the relationship among the plurality of theme content segments, the segment information of the video data and the relationship between the target segment and the video data.

In a possible implementation, in a case where the theme information is text information, the plurality of theme content segments may be text segments formed by division of the text information. For example, the text information may be divided with a character, a word or a phrase as a unit. For example, if the text information of the theme information is "fighting segment", the text information may be divided into 2 text segments with the word as the unit.

The relationship among the plurality of theme content segments may be a relationship between each segment and each of all the other segments.

In embodiments of the present disclosure, the association degree between the target segment and the theme information may be determined based on an analysis result of the theme information and an analysis result of the video data, thereby improving the accuracy of the determination of the association degree.

In a possible implementation, a graph of the theme information may be constructed based on the theme content segments of the theme information, with each theme content segment as a node of the graph and a relationship between each two segments as an edger, so that each theme content segment can be connected with other theme content segments, and any two different theme content segments can be connected whatever a distance therebetween is. In this way, associations of all the theme content segments of the entire theme information are taken into account, so that the association degree between the target segment and the theme information finally obtained is more accurate.

Figure 3:
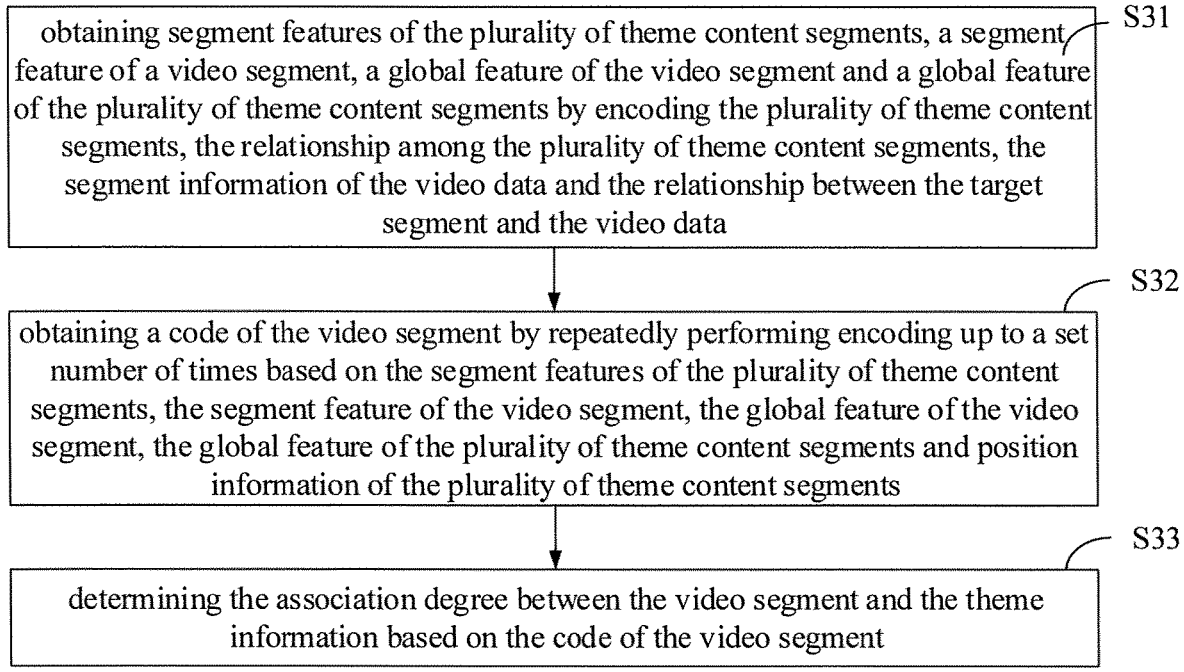
FIG. 3 is a schematic flowchart of a method for processing video data according to an embodiment of the present disclosure.

In a possible implementation, determining the association degree between the target segment and the theme information based on the plurality of theme content segments, the relationship among the plurality of theme content segments, the segment information of the video data and the relationship between the target segment and the video data includes operations as illustrated in blocks of FIG. 3.

At block S31, segment features of the plurality of theme content segments, a segment feature of a video segment, a global feature of a video segment and a global feature of the plurality of theme content segments are obtained by encoding the plurality of theme content segments, the relationship among the plurality of theme content segments, the segment information of the video data and the relationship between the target segment and the video data.

At block S32, a code of the video segment is obtained by repeatedly performing encoding up to a set number of times based on the segment features of the plurality of theme content segments, the segment feature of the video segment, the global feature of the video segment, the global feature of the plurality of theme content segments and position information of the plurality of theme content segments.

At block S33, an association degree between the video segment and the theme information is determined based on the code of the video segment.

In embodiments of the present disclosure, a relationship graph may be constructed based on a plurality of video segments of a video, with each video segment as a node of the relationship graph, relationships among the video segments as edges of the relationship graph, and the theme information also may be used to construct the edges between the video segments. The target segment is at least one of the plurality of video segments.

In embodiments of the present disclosure, the association degree between target segment and the theme information is determined by determining the features of the theme content segments and the global feature of the video segment, which may enhance the accuracy of the determination or calculation of the association degree.

In an implementation, determining the association degree between the video segment and the theme information based on the code of the video segment includes: acquiring a determination result by performing conditional random field (CRF) determination on the code of the video segment; and determining the association degree between the video segment and the theme information based on the determination result.

In embodiments of the present disclosure, the code may be classified based on the CRF determination, thereby determining the association degree between the video segment and the theme information.

In an implementation, acquiring the target segment of the video data to be extracted includes: obtaining a plurality of video segments of the video data to be extracted by dividing the video data based on a set interval; and taking at least one of the plurality of video segments of the video data as the target segment.

In a possible implementation, the plurality of video segments may be obtained by dividing the video data based on varying intervals.

In an example of the present disclosure, dividing the video data based on the set interval may be for example dividing the video data based on a certain number of seconds. Specifically, for example, if the video data is divided into video segments by N seconds, i.e., a video segment is obtained every N seconds, then a video segment from $0^{th}$ to $N^{th}$ second is taken as a first video segment, a video segment from $(N+1)^{th}$ to $2N^{th}$ second is taken as a second video segment, a video segment from $(2N+1)^{th}$ to $3N^{th}$ second is taken as a third video segment, and so on.

Alternatively, dividing the video data based on the set interval may also be for example dividing the video data based on a certain number of frames. For example, a video segment from $0^{th}$ to $N^{th}$ frame is taken as a first video segment, a video segment from $(N+1)^{th}$ to $2N^{th}$ frames is taken as a second video segment, a video segment from $(2N+1)^{th}$ to $3N^{th}$ frames is taken as a third video segment, and so on.

Taking at least one of the plurality of video segments of the video data as the target segment may include: taking each of the plurality of video segments as the target segments in sequence, and performing the operation of determining the association degree between the target segment and the theme information.

In embodiments of the present disclosure, the video data is divided into the plurality of video segments based on the set interval, so that each video segment of the video data has the opportunity to be taken as the target segment for determination of the association degree, which is conducive to screening out a video segment more consistent with the theme information from the video data.

In an implementation, the segment information includes a feature of the video segment. The method for processing the video data further includes: converting each video frame in the video segment to a vector of a set dimension, the vector of the set dimension including content information of a corresponding video frame; and determining the feature of the video segment based on the vector of the set dimension.

In embodiments of the present disclosure, for all video frames in the video segment, the above operation may be performed to determine the feature of the video segment.

Determining the feature of the video segment based on the vector of the set dimension may be taking the vector of the set segment as the feature of the video segment.

Determining the feature of the video segment based on the vector of the set dimension may also be performing further calculation on the vector of the set segment and taking a calculation result as the feature of the video segment.

In embodiments of the present disclosure, content information of the video frame may be converted into the feature of the video segment, so that the content information of the video frame can be fully utilized in the determination of the association degree, which improves the accuracy of the determination of the association degree.

In an embodiment, determining the feature of the video segment based on the vector of the set dimension includes: obtaining a spatio-temporal information feature of a video frame by performing 3-dimensional convolutional neural network (C3D) determination on the vector of the set dimension; and determining the feature of the video segment based on the spatio-temporal information feature of the video frame.

In embodiments of the present disclosure, the feature of the video segment is determined based on the spatio-temporal information feature of the video frame, so that temporal information and spatial information of the video frame may be used as conditions for determining the association degree, which improves the accuracy of the determination of the association degree.

Figure 4:
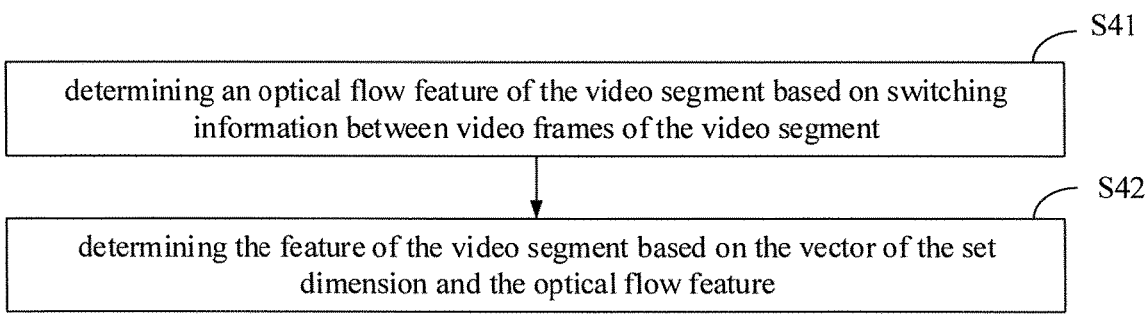
FIG. 4 is a schematic flowchart of a method for processing video data according to an embodiment of the present disclosure.

In an embodiment, determining the feature of the video segment based on the vector of the set dimension includes operations as illustrated in blocks of FIG. 4.

At block S41, an optical flow (OF) feature of the video segment is determined based on switching information between video frames of the video segment.

At block S42, the feature of the video segment is determined based on the vector of the set dimension and the OF feature.

In embodiments of the present disclosure, the feature of the video segment may be determined based on the switching information between the video frames of the video segment, so that a relative relationship between the video frames is fused in the determination of the association degree to make the determination result of the association degree more accurate.

In an embodiment, determining the feature of the video segment based on the vector of the set dimension and the OF feature includes: obtaining a spliced feature by splicing the vector of the set dimension, the spatio-temporal information feature of the video frame and the OF feature; and determining the feature of the video segment based on the spliced feature.

In embodiments of the present disclosure, the spatio-temporal information feature of the video frame, the vector of the set dimension and the OF feature are fused, so that the content and feature of the video frame of the video segment are fully considered in the determination of the association degree, to make the obtained association degree more accurate.

In an embodiment, determining the feature of the video segment based on the spliced feature includes: determining a feature of each video frame in the video segment based on a spliced feature of a previous video frame of the each video frame.

In embodiments of the present disclosure, each video frame and an adjacent video frame are combined to determine the feature of the each video frame, so that not only a characteristic of a video frame itself, but also a characteristic of the video frame relative to the entire video data are considered in the determination of the association degree, so as to make the obtained association degree more accurate.

In an embodiment, the relationship between the target segment and the video data includes a relationship between the target segment and a non-target segment in the video data, and time information of the target segment in the video data.

In embodiments of the present disclosure, the target segment and the non-target segment are relative, and a segment may be the target segment or the non-target segment in different rounds of determination processes. In the determination of the association degree between the target segment and the theme information using the method for processing video data according to embodiments of the present disclosure, if one of a plurality of video segments is selected as the target segment, other segments other than the target segment are considered as the non-target segments.

In embodiments of the present disclosure, the relationship between the target segment and the video data is used as a condition for the determination of the association degree, thereby improving the accuracy of the determination result of the association degree.

In an embodiment, the method for processing the video data further includes: determining a video abstract of the video data based on the association degree.

The video abstract aims to extract key frame or shot-level segment from a long video to solve the problem of a significant increase in views of a user caused by too many videos. The video abstract may contain the most useful content for the user, and may significantly save the time of the user for acquiring information. With the development of computer and video technologies, the video abstract has become one of operational contents of video editing.

Determining the video abstract of the video data based on the association degree may be screening out the target segment in response to the association degree between the target segment and the theme information being higher than a set association degree threshold, and splicing all video segments (or target segments) screened out into the video abstract.

In embodiments of the present disclosure, each vide segment in the video data may be taken as the target segment, and the video abstract is determined based on the association degree between the target segment of the video data and the given theme information, so that the video abstract can be determined based on the given theme information, which helps the user determine the main content of the video through the video abstract, and achieves the purpose of rapidly viewing the desired content.

In an example of the present disclosure, each video segment (or frame) in the video may be taken as a vertex, and relationships among the video segments may be taken as edges, and at the same time, a query thought is added, and features of the vertexes and edges are learned in the above network based on a graph learning (global optimum) algorithm, and then the features are input into a CRF model, to make prediction using an idea similar to tag labeling.

In an example of the present disclosure, the video abstract is controllably generated by using a structure based on a graph neural network. First, each video segment of the video needs to be converted to a node in the graph, and the query is also converted to a node in the graph, and then a graph learning method is used to perform feature learning on each node, and finally a learned feature is input into the CRF model for tag classification of the video segments to output the video abstract.

In examples of the present disclosure, the query may be a theme contained or may be contained in the video abstract, after the video abstract is generated from an original long video for the user. The graph neural network may be a neural network based on a graph structure, and the network includes two main states, i.e., the vertex and the edge.

Figure 5:
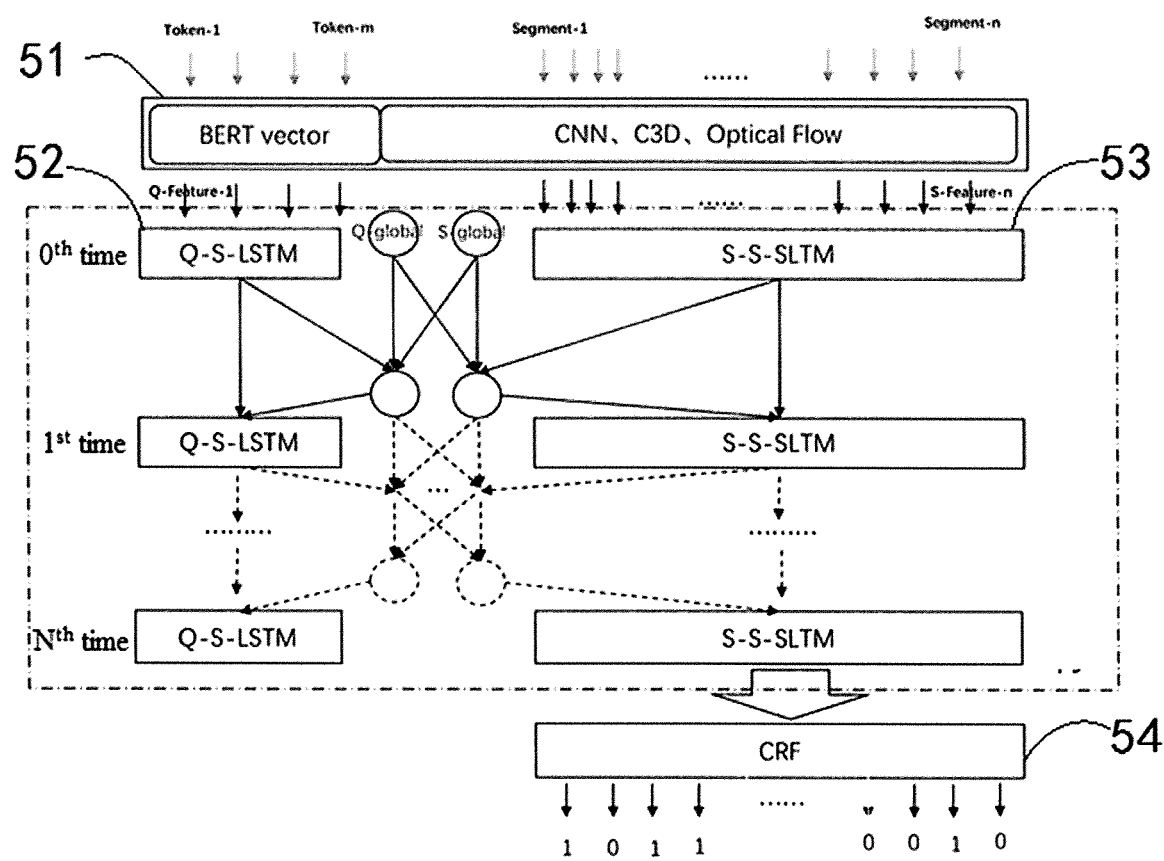
FIG. 5 is a schematic diagram illustrating a model structure according to an example of the present disclosure.

The method for processing the video data provided in examples of the preset disclosure may be executed by a neural network model in examples of the present disclosure. As illustrated in FIG. 5, the neural network model includes BERT model 51, a Q-S-LSTM 52, an S-S-LSTM 53 and a CRF 54, where S-LSTM may refer to a sentence-state long short-term memory graph neural network, Q-S-LSTM may refer to a sentence-state long short-term memory graph neural network of a query, and S-S-LSTM may refer to a sentence-state long short-term memory graph neural network of video segments. CRF may be a sequence labeling algorithm that receives an input sequence and outputs a target sequence. In embodiments of the present disclosure, the BERT model may be a bidirectional encoder representation from transformer model, and may be a pre-trained language representation model. The BERT model emphasizes pre-training using a new masked language model (MLM) to generate a deep bidirectional language representation, rather than using a traditional unidirectional language model or shallow splicing two unidirectional language models. In embodiments of the present disclosure, a visual-linguistic BERT (VL-BERT) model may be used, which may be a multi-modal pre-trained model, and its input information may be a text or an image.

The theme information is converted to a vector. In a case where the theme information includes a text, a token is used to represent a vector corresponding to each text unit (such as each character, word or phrase). The theme information is divided into m text units, which correspond to m vectors, represented by token 1, token 2, . . . , and token m, respectively. The video data is divided into n video segments, represented by segment 1, segment 2, . . . , and segment n, respectively. The m vectors corresponding to the theme information are input into the BERT model to obtain a BERT vector, and a convolutional neural network (CNN) feature, a 3-dimensional convolutional neural network (C3D) feature and an optical flow (OF) feature of each video segment are obtained by calculation based on the segment 1, segment 2, . . . , and segment n. The CNN feature, the C3D feature and the OF feature of each video segment, and the vectors corresponding to the text units of the theme information are input into a part of the graph neural network including the S-S-LSTM 53 and the Q-S-LSTM 52 to obtain a code of each video feature, and the code is input into the CRF 54 to obtain a classification result of each video segment as a video abstract corresponding to the theme information. The classification result may include numbers 0 and 1, where 0 may represent not belonging to the video abstract corresponding to the theme information, and 1 may represent belonging to the video abstract corresponding to the theme information.

Figure 6:
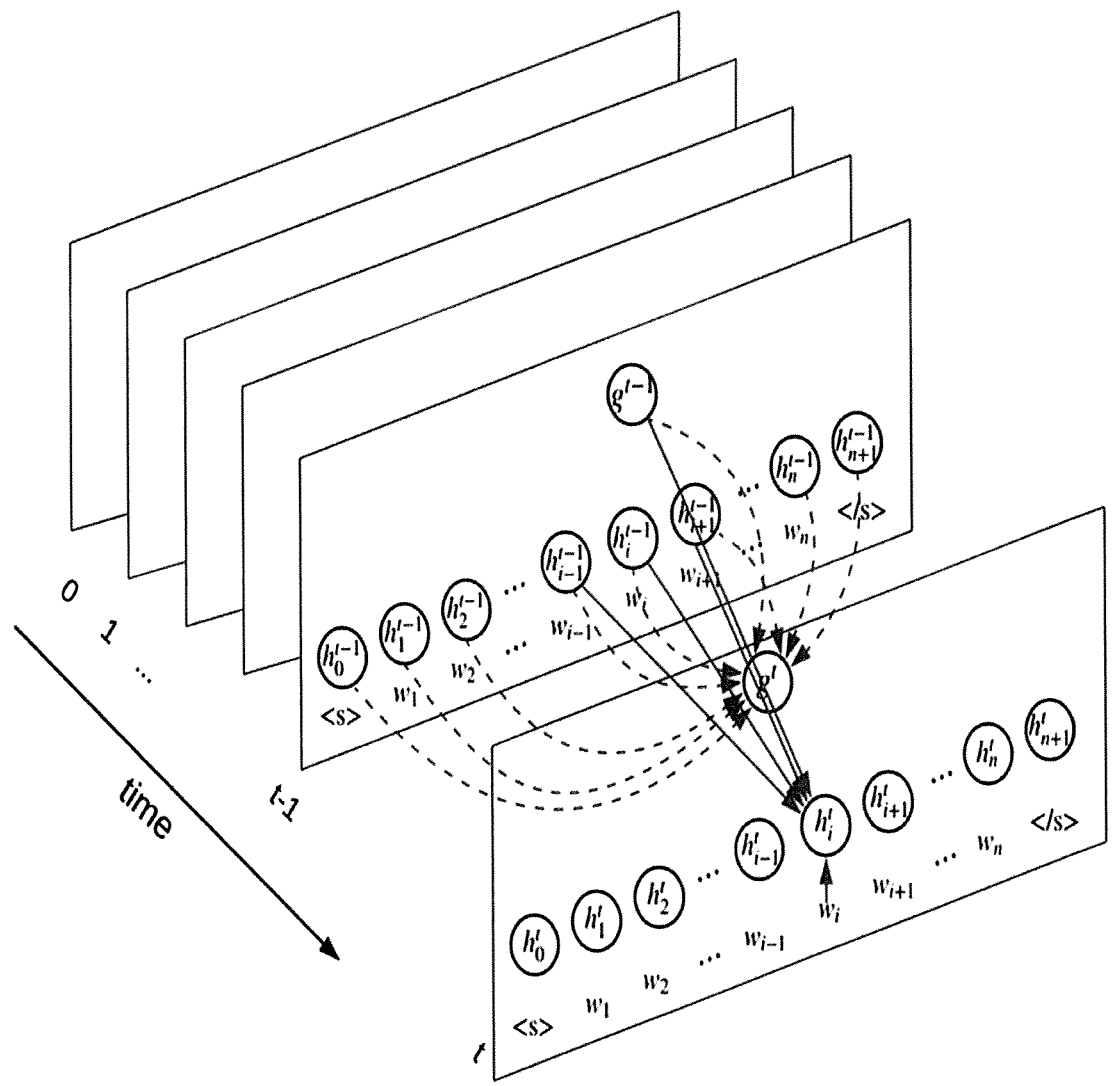
FIG. 6 is a schematic diagram illustrating that a model processes a plurality of video frames according to an example of the present disclosure.

FIG. 6 is a schematic diagram illustrating the processing of video frames of a video segment using S-LSTM according to an example of the present disclosure, where h represents a learning parameter, and its content may be a hidden variable, t represents the time, w represents an input vector, and g represents global information of all learning parameters of a current video frame.

Figure 7:
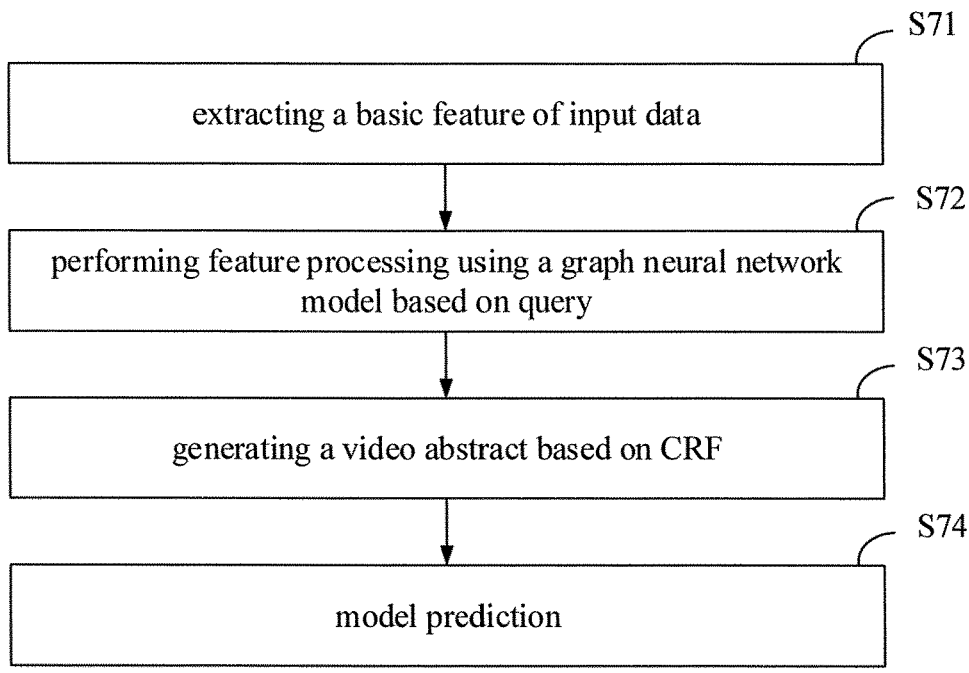
FIG. 7 is a schematic flowchart of a method for processing video data according to an example of the present disclosure.

The method for processing video data according to an example of the present disclosure includes operations as illustrated in blocks of FIG. 7.

At block S71, a basic feature of input data is extracted.

There are two different types of model inputs, i.e., text type data and video type data, and the text type data represents the theme information. For the text type data, a word vector is pre-trained directly using the BERT vector. For the video type data (that is, the video data as described in the above embodiments), it is subjected to segmentation processing first, for example, the video type data is divided into video segments with 5 s (or other time period or a certain number of video frames) as a division unit, and for a video segment, 3 aspects of features, i.e., a frame feature, a C3D feature, and an OF feature, need to be acquired.

The frame feature is extracted using a residual neural network (RESNET) to obtain a 2048-dimensional feature, and then an average value is determined for a series of frames. In a specific implementation, a key feature may be determined based on an image of each video frame.

The C3D feature is obtained by a 3-dimensional CNN (a CNN for processing 3-dimensional spatial information) added with a spatial dimension, to capture spatio-temporal information.

The OF feature among video frames may be acquired using a Gunner Farneback algorithm, and the OF feature includes speed information of switching between images.

The 3 types of features acquired are cascaded (nested) as a final feature representation of the entire video segment.

At block S72, feature processing is performed using a graph neural network model based on query.

In an example of the present disclosure, the method based on the graph neural network model is used in feasibility of generation of a video abstract, since each video segment in the video data has many other relationships in addition to a temporal relationship, specifically in the case where the video data is divided, edges may be constructed naturally among segments. The meaning of the edge may be acquired through a trained model. In examples of the present disclosure, a graph structure may be used to model video information, so that the model may learn information such as diversity between video segments and importance of a video segment itself. In embodiments of the present disclosure, the overall diversity of the video segments may be learned from the edges of the graph, and the importance of a vide segment itself may be acquired from the relationship between the vertex and the edge. At the same time, in embodiments of the present disclosure, a graph learning model based on query is proposed, so that on the basis of determining the association degree between the target segment and the theme information, a special video abstract may be generated based on the user's needs. The implementation of the model may formalized as:

$$P(y_1{}^n | q, v) = Q\_S\_LSTM_i(Q_v, V_v),$$

where an input query (i.e., the theme information) consists of $q = q_1, q_2, \ldots, q_m$, that is, q in the above formula represents a theme content segment, Q represents a vector of a theme content segment, a video consists of $v = s_1, s_2, s_3, \ldots, s_n$, that is, v in the above formula represents a video segment, V represents a vector of a video segment, n represents a number of video segments, P represents a probability, i.e., an association degree, y represents a value of an output tag 10101, one of the values 1 and 0 may be used to represent conforming to the theme information, and the other one of the values 1 and 0 represents not conforming to the theme information. Specifically, for example, when the value of y is 1, it indicates that a corresponding video segment is selected, and when the value is 0, it indicates that the corresponding video segment is not selected, and all video segments with the value of 1 can be combined to obtain a video abstract. In examples of the present disclosure, lowercase letters in the above formula may represent a real input or output, and capital letters may represent a vector or a feature.

The feature Q of a theme content segment of the input theme information is:

$$Q_v = BERT(q),$$

where q is the theme content segment.

The feature V of a video segment of the input video data is:

$$V_v = [CNN(V) | C3D(V) | OF(V)],$$

where CNN represents convolutional neural network feature determination, C3D represents 3-dimensional convolutional neural network feature determination, and OF represents optical flow feature determination, and | represents vector splicing.

At block S73, a video abstract is generated based on CRF.

At the block S72, the features of the video segments based on the graph learning are acquired, and at the block S73, the learned features may be sequence labeled and output. A CRF algorithm is used, when a segment is in the video abstract for more than half of its time, it is labeled as 1, otherwise it is labeled as 0, and then model training is performed using the input feature and the label.

At block S74, model prediction is performed.

Model processing is performed based on the operation as illustrated at the block S73, statistics is performed on the output result of the operation as illustrated at the block S73, when the result is 1, a corresponding video segment is selected, otherwise the corresponding video segment is discarded, and then the selected video segments are spliced in time sequence to complete the generation of the video abstract.

In an embodiment, the association degree is determined by using a graph neural network.

Figure 8:
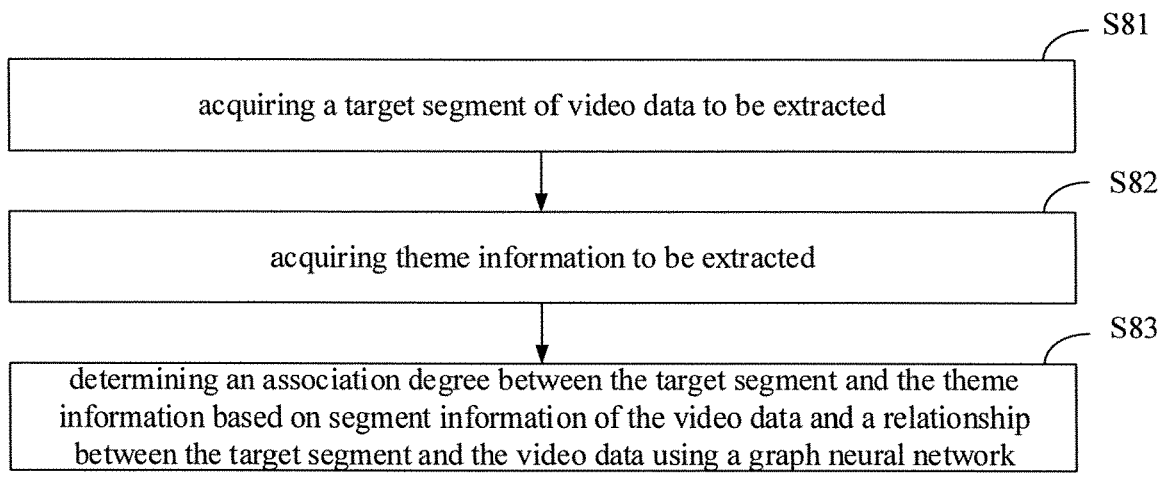
FIG. 8 is a schematic flowchart of a method for processing video data according to an embodiment of the present disclosure.

Embodiments of the present disclosure of the present disclosure further provide a method for processing video data. The method includes operations as illustrated in blocks of FIG. 8.

At block S81, a target segment of video data to be extracted is acquired.

At block S82, theme information to be extracted is acquired.

At block S83, an association degree between the target segment and the theme information is determined based on segment information of the video data and a relationship between the target segment and the video data by using a graph neural network.

Figure 9:
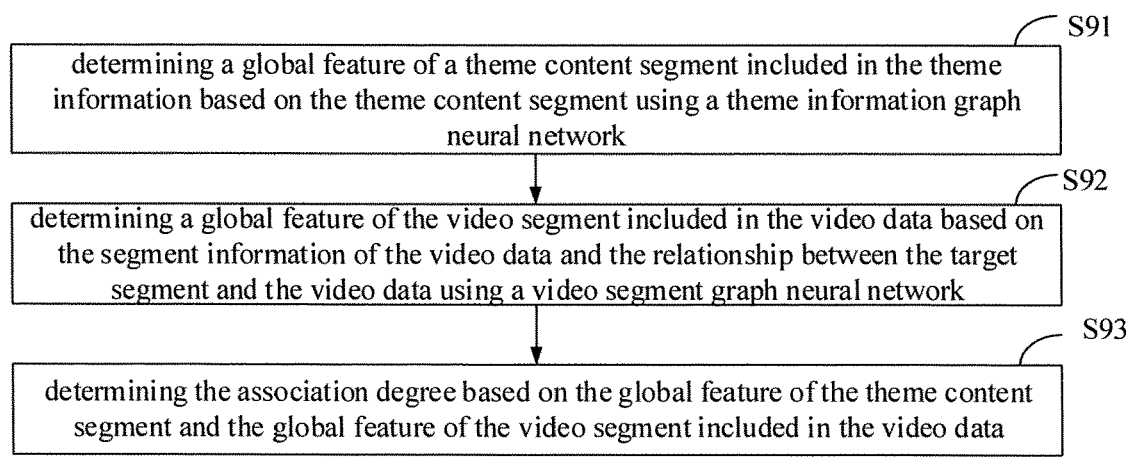
FIG. 9 is a schematic flowchart of a method for processing video data according to an embodiment of the present disclosure.

In one implementation, the graph neural network includes a theme information graph neural network and a video segment graph neural network. Determining the association degree between the target segment and the theme information based on the segment information of the video data and the relationship between the target segment and the video data includes operations as illustrated in blocks of FIG. 9.

At block S91, a global feature of a theme content segment included in the theme information is determined based on the theme content segment using the theme information graph neural network.

At block S92, a global feature of a video segment included in the video data is determined based on the segment information of the video data and the relationship between the target segment and the video data using the video segment graph neural network.

At block S93, the association degree is determined based on the global feature of the theme content segment and the global feature of the video segment included in the video data.

Figure 10:
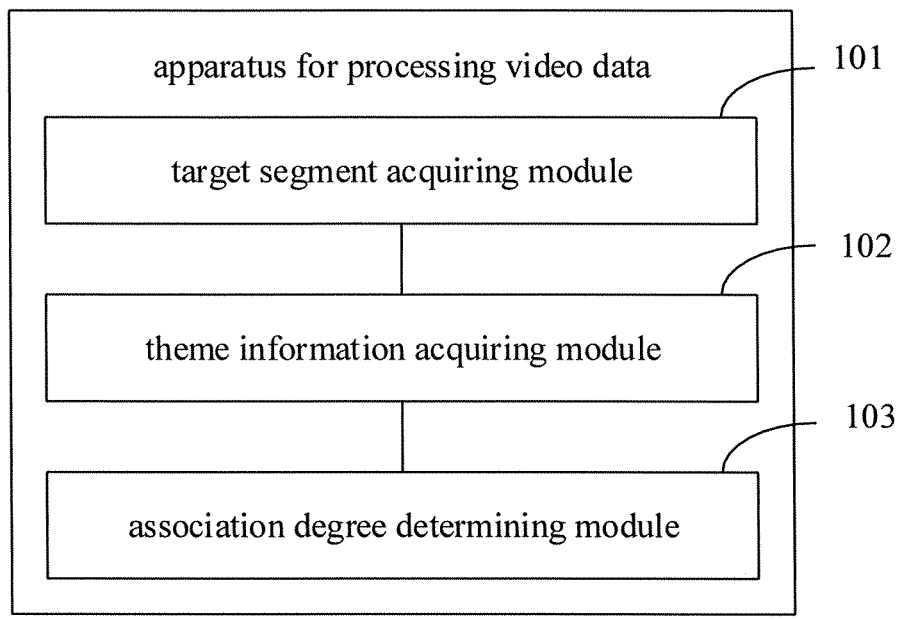
FIG. 10 is a schematic block diagram of an apparatus for processing video data according to an embodiment of the present disclosure.

An apparatus for processing video data is further provided in embodiments of the present disclosure. As illustrated in FIG. 10, the apparatus includes: a target segment acquiring module 101, a theme information acquiring module 102 and an association degree determining module 103.

The target segment acquiring module 101 is configured to acquire a target segment of video data to be extracted.

The theme information acquiring module 102 is configured to acquire theme information to be extracted.

The association degree determining module 103 is configured to determine an association degree between the target segment and the theme information based on segment information of the video data and a relationship between the target segment and the video data.

Figure 11:
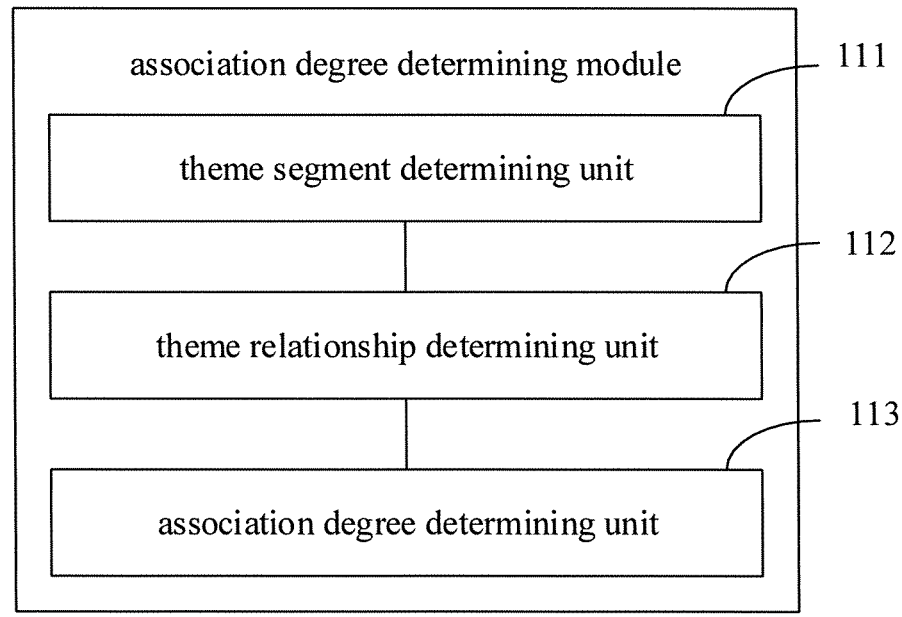
FIG. 11 is a schematic block diagram of an apparatus for processing video data according to an embodiment of the present disclosure.

In an embodiment, as illustrated in FIG. 11, the association degree determining module includes a theme segment determining unit 111, a theme relationship determining unit 112 and an association degree determining unit 113.

The theme segment determining unit 111 is configured to determine a plurality of theme content segments based on the theme information.

The theme relationship determining unit 112 is configured to determine a relationship among the plurality of theme content segments.

The association degree determining unit 113 is configured to determine the association degree between the target segment and the theme information based on the plurality of theme content segments, the relationship among the plurality of theme content segments, the segment information of the video data and the relationship between the target segment and the video data.

In an embodiment, the association degree determining unit 113 is further configured to: obtain segment features of the plurality of theme content segments, a segment feature of a video segment, a global feature of the video segment and a global feature of the plurality of theme content segments by encoding the plurality of theme content segments, the relationship among the plurality of theme content segments, the segment information of the video data and the relationship between the target segment and the video data; obtain a code of the video segment by repeatedly performing encoding up to a set number of times based on the segment features of the plurality of theme content segments, the segment feature of the video segment, the global feature of the video segment, the global feature of the plurality of theme content segments and position information of the plurality of theme content segments; and determine an association degree between the video segment and the theme information based on the code of the video segment.

In an embodiment, the association degree determining unit 113 is further configured to: acquire a determination result by performing conditional random field (CRF) determination on the code of the video segment; and determine the association degree between the video segment and the theme information based on the determination result.

Figure 12:
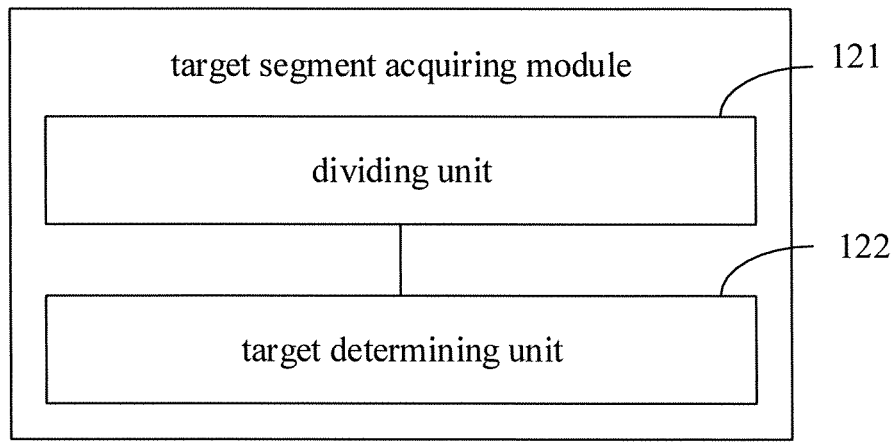
FIG. 12 is a schematic block diagram of an apparatus for processing video data according to an embodiment of the present disclosure.

In an embodiment, as illustrated in FIG. 12, the target segment acquiring module 101 includes a dividing unit 121 and a target determining unit 122.

The dividing unit 121 is configured to obtain a plurality of video segments of the video data to be extracted by dividing the video data based on a set interval.

The target determining unit 122 is configured to take at least one of the plurality of video segments of the video data as the target segment.

Figure 13:
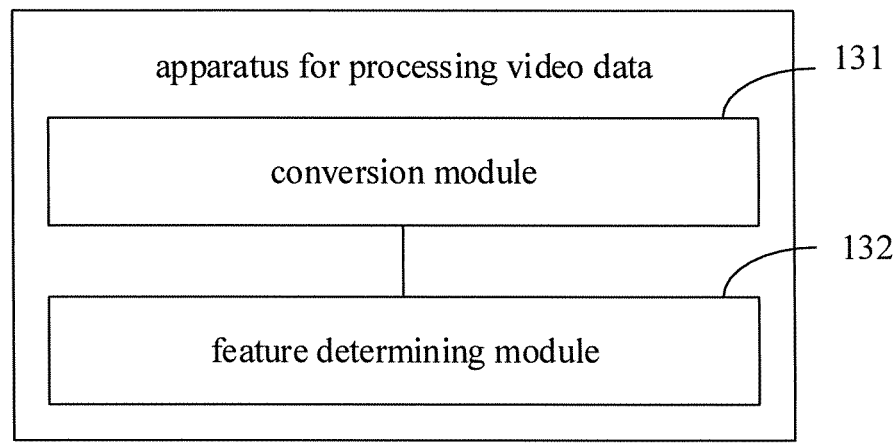
FIG. 13 is a schematic block diagram of an apparatus for processing video data according to an embodiment of the present disclosure.

In an embodiment, the segment information includes a feature of a video segment. As illustrated in FIG. 13, the apparatus for processing video data further includes a conversion module 131 and a feature determining module 132.

The conversion module 131 is configured to convert each video frame in the video segment to a vector of a set dimension, and the vector of the set dimension includes content information of a corresponding video frame.

The feature determining module 132 is configured to determine the feature of the video segment based on the vector of the set dimension.

Figure 14:
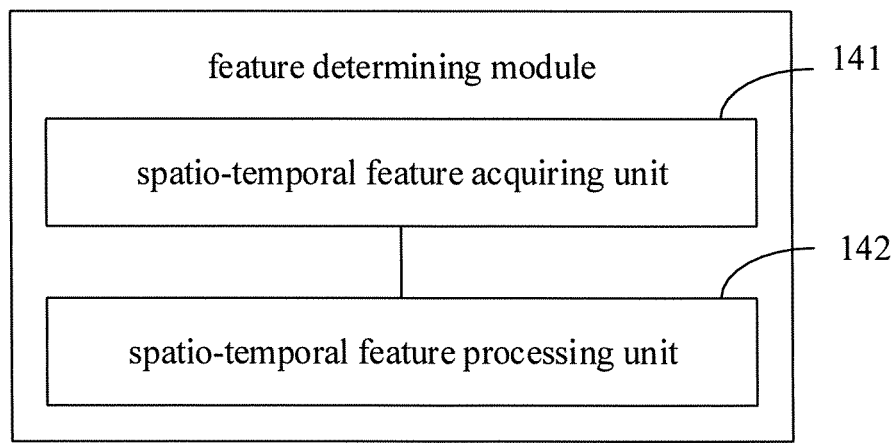
FIG. 14 is a schematic block diagram of an apparatus for processing video data according to an embodiment of the present disclosure.

In an embodiment, as illustrated in FIG. 14, the feature determining module 132 includes a spatio-temporal feature acquiring unit 141 and a spatio-temporal feature processing unit 142.

The spatio-temporal feature acquiring unit 141 is configured to obtain a spatio-temporal information feature of a video frame by performing 3-dimensional convolutional neural network (C3D) determination on the vector of the set dimension.

The spatio-temporal feature processing unit 142 is configured to determine the feature of the video segment based on the spatio-temporal information feature of the video frame.

Figure 15:
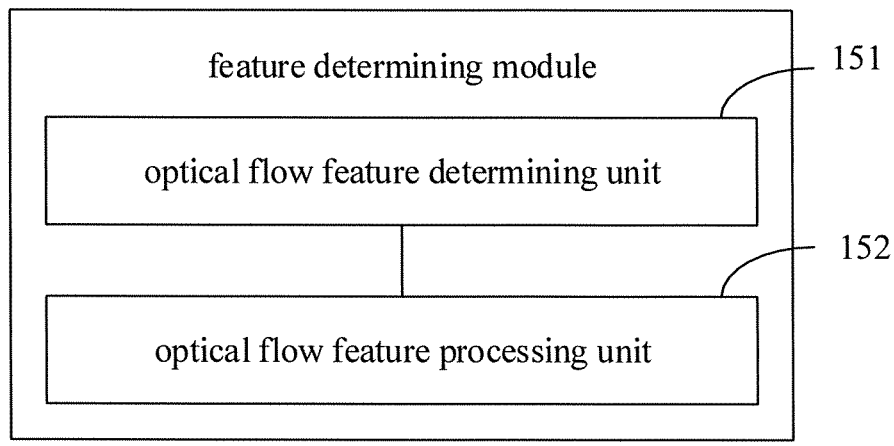
FIG. 15 is a schematic block diagram of an apparatus for processing video data according to an embodiment of the present disclosure.

In an embodiment, as illustrated in FIG. 15, the feature determining module 132 includes an optical flow feature determining unit 151 and an optical flow feature processing unit 152.

The optical flow feature determining unit 151 is configured to determine an optical flow (OF) feature of the video segment based on switching information between video frames of the video segment.

The optical flow feature processing unit 152 is configured to determine the feature of the video segment based on the vector of the set dimension and the OF feature.

In an embodiment, the optical flow feature processing unit 152 is further configured to: obtain a spliced feature by splicing the vector of the set dimension, the spatio-temporal information feature of the video frame and the OF feature; and determine the feature of the video segment based on the spliced feature.

In an embodiment, the optical flow feature processing unit 152 is further configured to: determine a feature of each video frame in the video segment based on the spliced feature of a previous video frame of the each video frame.

In an embodiment, the relationship between the target segment and the video data includes a relationship between the target segment and a non-target segment in the video data, and time information of the target segment in the video data.

Figure 16:
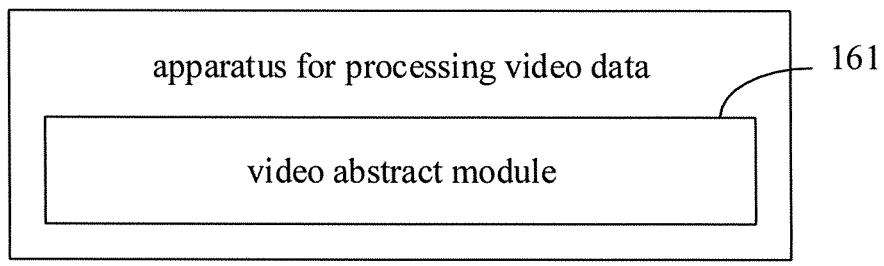
FIG. 16 is a schematic block diagram of an apparatus for processing video data according to an embodiment of the present disclosure.

In an embodiment, as illustrated in FIG. 16, the apparatus for processing video data further includes a video abstract determining module 161.

The video abstract determining module 161 is configured to determine a video abstract of the video data based on the association degree.

In an embodiment, the association degree determining module 103 is configured to determine the association degree by using a graph neural network.

In an embodiment, the graph neural network includes a theme information graph neural network and a video segment graph neural network. The association degree determining unit 113 is further configured to: determine a global feature of a theme content segment included in the theme information based on the theme content segment using the theme information graph neural network; determine a global feature of a video segment included in the video data based on the segment information of the video data and the relationship between the target segment and the video data using the video segment graph neural network; and determine the association degree based on the global feature of the theme content segment and the global feature of the video segment included in the video data.

Figure 17:
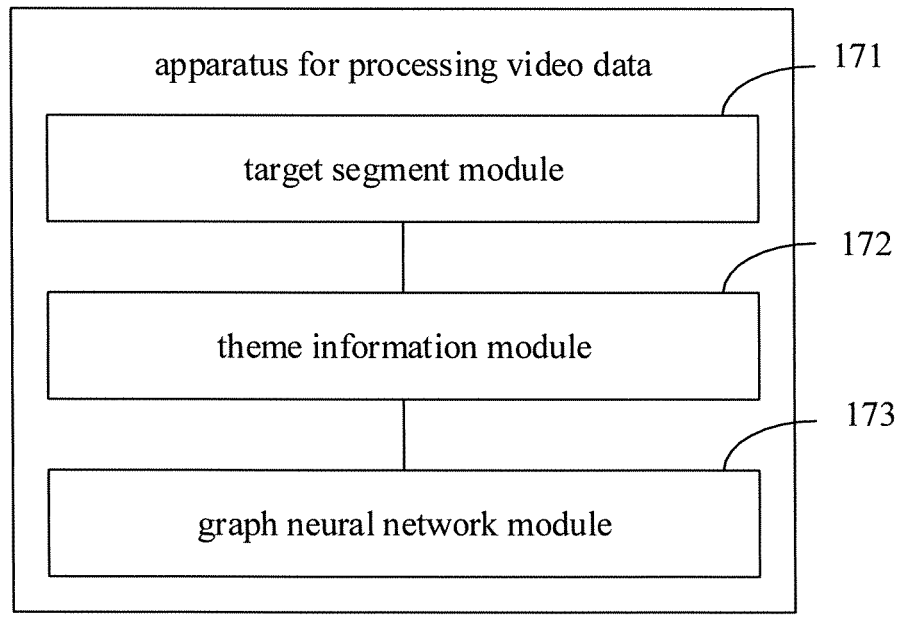
FIG. 17 is a schematic block diagram of an apparatus for processing video data according to an embodiment of the present disclosure.

An apparatus for processing video data is further provided in embodiments of the present disclosure. As illustrated in FIG. 17, the apparatus includes a target segment module 171, a theme information module 172 and a graph neural network module 173.

The target segment module 171 is configured to acquire a target segment of video data to be extracted.

The theme information module 172 is configured to acquire theme information to be extracted.

The graph neural network module 173 is configured to determine an association degree between the target segment and the theme information based on segment information of the video data and a relationship between the target segment and the video data by using a graph neural network.

Figure 18:
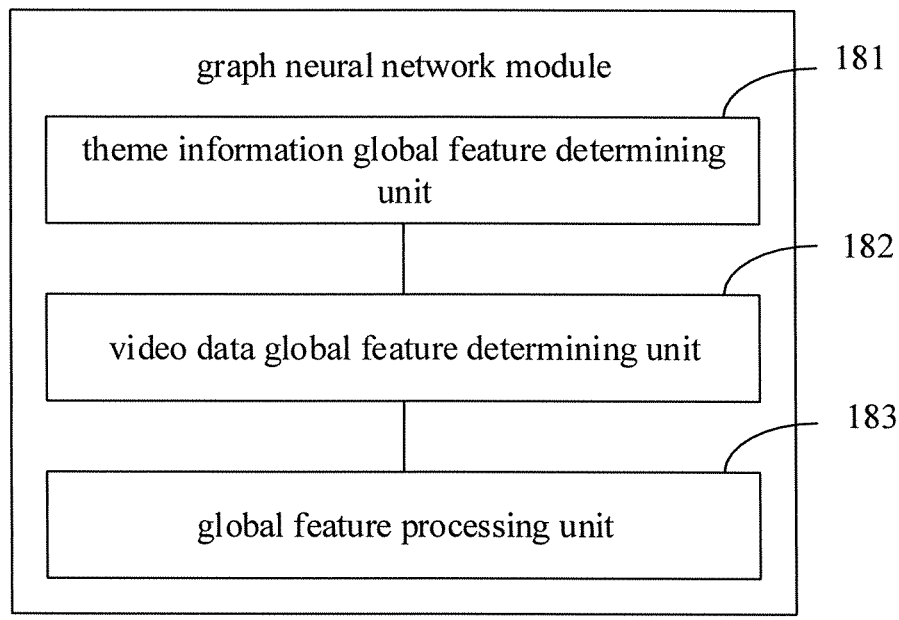
FIG. 18 is a schematic block diagram of an apparatus for processing video data according to an embodiment of the present disclosure.

In an embodiment, as illustrated in FIG. 18, the graph neural network module includes a theme information global feature determining unit 181, a video data global feature determining unit 182 and a global feature processing unit 183.

The theme information global feature determining unit 181 is configured to determine a global feature of a theme content segment included in the theme information based on the theme content segment using a theme information graph neural network.

The video data global feature determining unit 182 is configured to determine a global feature of a video segment included in the video data based on the segment information of the video data and the relationship between the target segment and the video data using a video segment graph neural network.

The global feature processing unit 183 is configured to determine the association degree based on the global feature of the theme content segment and the global feature of the video segment included in the video data.

The acquisition, storage, and application of the user's personal information involved in the technical solutions of the present disclosure comply with relevant laws and regulations, and do not violate public order and good customs.

According to embodiments of the present disclosure, an electronic device, a readable storage medium and a computer program product are further provided in the present disclosure.

According to embodiments of the present disclosure, an electronic device is provided. The electronic device includes: at least one processor; and a memory communicatively connected to the at least one processor, the memory is stored with instructions executable by the at least one processor, and the instructions, when executed by the at least one processor, cause the at least one processor to perform the method as described in any embodiment of the present disclosure.

According to embodiments of the present disclosure, a non-transitory computer readable storage medium is provided. The non-transitory computer readable storage medium has stored therein computer instructions that, when executed by a computer, cause the computer to perform the method as described in any embodiment of the present disclosure.

According to embodiments of the present disclosure, a computer program product including a computer program/instruction is provided. When the computer program/instruction is performed by a processor, the method as described in any embodiment of the present disclosure is implemented.

With the technology according to the present disclosure, the association degree between the target segment of the video data and the theme information can be determined, so that it can be determined that the target segment is highly associated with the theme information in response to the target segment being highly consistent with the theme information, thereby determining theme information of the target segment or determining a segment from the video data as the target segment consistent with the theme information.

Figure 19:
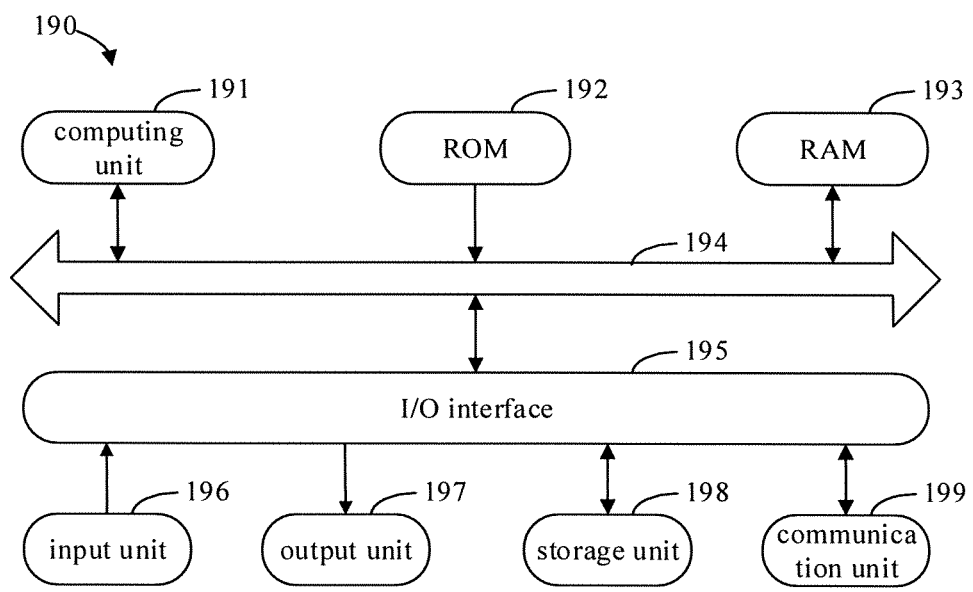
FIG. 19 is a schematic block diagram of an electronic device for implementing a method for processing video data according to embodiments of the present disclosure.

FIG. 19 is a schematic block diagram illustrating an example electronic device 190 which can be used to implement embodiments of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable devices, and other similar computing devices. The components shown herein, their connections and relationships, and their functions are merely examples, and are not intended to limit the implementations of the present disclosure described and/or claimed herein.

As illustrated in FIG. 19, the device 190 includes a computing unit 191, configured to execute various appropriate actions and processing according to a computer program stored in a read-only memory (ROM) 192 or loaded from a storage unit 198 to a random access memory (RAM) 193. In the RAM 193, various programs and data required by operations of the device 190 may also be stored. The computing unit 191, the ROM 902 and the RAM 193 may be connected with each other by a bus 194. An input/output (I/O) interface 195 is also connected to the bus 194.

A plurality of components in the electronic device 190 are connected to the I/O interface 195, including: an input unit 196, for example, a keyboard, a mouse, etc.; an output unit 197, for example various types of displays, speakers, etc.; a memory unit 198, for example a magnetic disk, an optical disk, etc.; and a communication unit 199, for example, a network card, a modem, a wireless transceiver, etc. The communication unit 199 allows the device 190 to exchange information/data with other devices through a computer network such as internet and/or various types of telecommunication networks.

The computing unit 191 may be various types of general and/or dedicated processing components with processing and computing ability. Some examples of the computing unit 191 include but are not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 191 executes various methods and processing operations as described above, for example, the method for processing video data. For example, in some embodiments, the method for processing video data may be implemented as a computer software program, which is physically contained in a machine readable medium, such as the storage unit 198. In some embodiments, some or all of the computer programs may be loaded and/or mounted on the electronic device 190 via the ROM 192 and/or the communication unit 199. When the computer program is loaded on the RAM 193 and executed by the computing unit 191, one or more operations in the method for processing video data as described above may be performed. Alternatively, in other embodiments, the computing unit 191 may be configured to perform the method for processing video data in any other appropriate ways (for example, by virtue of a firmware).

Various embodiments of the systems and technologies described herein may be implementation in a digital electronic circuit system, an integrated circuit system, a field programmable gate array (FPGA), an application-specific integrated circuit (ASIC), an application specific standard product (ASSP), a system-on-chip (SOC) system, a complex programmable logic device (CPLD), a computer hardware, a firmware, a software, and/or combinations thereof. The various embodiments may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The program codes used to implement the method of the present disclosure can be written in one or any combination of a plurality of programming languages. These program codes can be provided to a processor or controller of a general-purpose computer, a special-purpose computer or other programmable data processing devices, so that when the program codes are executed by the processor or controller, the functions/operations specified in the flowcharts and/or block diagrams are implemented. The program codes can be executed entirely on a machine, partly executed on a machine, partly executed on a machine and partly executed on a remote machine as an independent software package, or entirely executed on a remote machine or a server.

In the context of the present disclosure, a machine-readable medium may be a tangible medium, which may contain or store a program for use by an instruction execution system, an apparatus or a device or for use in combination with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination of the foregoing. More specific examples of the machine-readable storage medium may include electrical connection based on one or more wires, a portable computer disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device or any suitable combination of the foregoing.

In order to provide interaction with a user, the systems and technologies described here can be implemented on a computer, which has: a display apparatus for displaying information to the user (for example, a CRT (cathode ray tube) or LCD (liquid crystal display) monitor); and a keyboard and pointing apparatus (for example, a mouse or a trackball), through which the user can provide input to the computer. Other types of apparatuses can also be used to provide interaction with the user; for example, the feedback provided to the user can be any form of sensory feedback (for example, visual feedback, auditory feedback or tactile feedback); and input from the user can be received in any form (including acoustic input, voice input or tactile input).

The systems and technologies described here can be implemented in a computing system that includes back-end components (for example, as a data server), or a computing system that includes middleware components (for example, an application server), or a computing system that includes front-end components (for example, a user computer with a graphical user interface or a web browser, through which the user can interact with the embodiments of the systems and technologies described herein), or a computing system that includes any combination of such back-end components, middleware components or front-end components. The components of the system can be connected to each other through any form or medium of digital data communication (for example, a communication network). Examples of the communication network include: a local area network (LAN), a wide area network (WAN), and the Internet.

The computer system may include a client and a server. The client and the server are generally far away from each other and usually interact through a communication network. The relationship between the client and the server will be generated by a computer program that runs on a corresponding computer and has a client-server relationship with each other. The server may be a cloud server, a server of a distributed system, or a server combined with a blockchain.

It should be understood that the various forms of flows shown above can be used to reorder, add or delete steps. For example, the respective steps described in the present disclosure may be executed in parallel, or also may be executed sequentially, or also may be executed in a different order, which will be not limited herein, as long as the desired result of the technical solution disclosed in the present disclosure can be achieved.

Terms used in the present disclosure are only for the purpose of describing specific embodiments, but should not be construed to limit the present disclosure. As used in the present disclosure and the appended claims, "a/an", "said" and "the" in singular forms are intended to include plural forms, unless clearly indicated in the context otherwise. It should also be understood that, the term "and/or" used herein represents and cover any one or all possible combinations of one or more associated listed items.

It should be understood that, although terms such as "first," "second" and "third" may be used in the present disclosure for describing various information, these information should not be limited by these terms. These terms are only used for distinguishing information of the same type from each other. For example, first information may also be referred to as second information, and similarly, second information may also be referred to as first information, without departing from the scope of the present disclosure. As used herein, the term "if" may be construed to mean "when" or "upon" or "in response to determining", depending on the context.

The foregoing specific embodiments do not constitute limitation on the protection scope of the present disclosure. Those skilled in the art should understand that various modifications, combinations, sub-combinations and substitutions can be made according to design requirements and other factors. Any modification, equivalent replacement, improvement and the like made within the spirit and principle of the present disclosure shall be included in the protection scope of the present disclosure.

What is claimed is:

1. A method for processing video data, comprising:
   acquiring a target segment of video data to be extracted;
   acquiring theme information to be extracted; and
   determining an association degree between the target segment and the theme information based on segment information of the video data and a relationship between the target segment and the video data;
   wherein the association degree is determined by using a graph neural network.

2. The method of claim 1, wherein determining the association degree between the target segment and the theme information based on the segment information of the video data and the relationship between the target segment and the video data comprises:
   determining a plurality of theme content segments based on the theme information;
   determining a relationship among the plurality of theme content segments; and
   determining the association degree between the target segment and the theme information based on the plurality of theme content segments, the relationship among the plurality of theme content segments, the segment information of the video data and the relationship between the target segment and the video data.

3. The method of claim 2, wherein determining the association degree between the target segment and the theme information based on the plurality of theme content segments, the relationship among the plurality of theme content segments, the segment information of the video data and the relationship between the target segment and the video data comprises:
   obtaining segment features of the plurality of theme content segments, a segment feature of a video segment, a global feature of the video segment and a global feature of the plurality of theme content segments by encoding the plurality of theme content segments, the relationship among the plurality of theme content segments, the segment information of the video data and the relationship between the target segment and the video data;
   obtaining a code of the video segment by repeatedly performing encoding up to a set number of times based on the segment features of the plurality of theme content segments, the segment feature of the video segment, the global feature of the video segment, the global feature of the plurality of theme content segments and position information of the plurality of theme content segments; and
   determining an association degree between the video segment and the theme information based on the code of the video segment.

4. The method of claim 3, wherein determining the association degree between the video segment and the theme information based on the code of the video segment comprises:
   acquiring a determination result by performing conditional random field (CRF) determination on the code of the video segment; and
   determining the association degree between the video segment and the theme information based on the determination result.

5. The method of claim 1, wherein acquiring the target segment of the video data to be extracted comprises:
   obtaining a plurality of video segments of the video data to be extracted by dividing the video data based on a set interval; and
   taking at least one of the plurality of video segments of the video data as the target segment.

6. The method of claim 1, wherein the segment information comprises a feature of a video segment, and the method further comprises:
   converting each video frame in the video segment to a vector of a set dimension, the vector of the set dimension comprising content information of a corresponding video frame; and
   determining the feature of the video segment based on the vector of the set dimension.

7. The method of claim 6, wherein determining the feature of the video segment based on the vector of the set dimension comprises:

obtaining a spatio-temporal information feature of a video frame by performing 3-dimensional convolutional neural network (C3D) determination on the vector of the set dimension; and determining the feature of the video segment based on the spatio-temporal information feature of the video frame.

8. The method of claim 6, wherein determining the feature of the video segment based on the vector of the set dimension comprises:

determining an optical flow (OF) feature of the video segment based on switching information between video frames of the video segment; and determining the feature of the video segment based on the vector of the set dimension and the OF feature.

9. The method of claim 8, wherein determining the feature of the video segment based on the vector of the set dimension and the OF feature comprises:

obtaining a spliced feature by splicing the vector of the set dimension, the spatio-temporal information feature of the video frame and the OF feature; and determining the feature of the video segment based on the spliced feature.

10. The method of claim 9, wherein determining the feature of the video segment based on the spliced feature comprises:

determining a feature of each video frame in the video segment based on a spliced feature of a previous video frame of the each video frame.

11. The method of claim 1, wherein the relationship between the target segment and the video data comprises a relationship between the target segment and a non-target segment in the video data, and time information of the target segment in the video data.

12. The method of claim 1, wherein the graph neural network comprises a theme information graph neural network and a video segment graph neural network; and determining the association degree comprises:

determining a global feature of a theme content segment comprised in the theme information based on the theme content segment using the theme information graph neural network;

determining a global feature of a video segment comprised in the video data based on the segment information of the video data and the relationship between the target segment and the video data using the video segment graph neural network; and determining the association degree based on the global feature of the theme content segment and the global feature of the video segment comprised in the video data.

13. The method of claim 1, further comprising:

determining a video abstract of the video data based on the association degree.

14. An electronic device, comprising:

at least one processor; and a memory communicatively connected to the at least one processor; wherein, the memory is stored with instructions executable by the at least one processor, and the instructions, when executed by the at least one processor, cause the at least one processor to perform a method for processing video data, comprising:

acquiring a target segment of video data to be extracted;

acquiring theme information to be extracted; and determining an association degree between the target segment and the theme information based on segment information of the video data and a relationship between the target segment and the video data;

wherein the association degree is determined by using a graph neural network.

15. The electronic device of claim 14, wherein determining the association degree between the target segment and the theme information based on the segment information of the video data and the relationship between the target segment and the video data comprises:

determining a plurality of theme content segments based on the theme information;

determining a relationship among the plurality of theme content segments; and determining the association degree between the target segment and the theme information based on the plurality of theme content segments, the relationship among the plurality of theme content segments, the segment information of the video data and the relationship between the target segment and the video data.

16. The electronic device of claim 15, wherein determining the association degree between the target segment and the theme information based on the plurality of theme content segments, the relationship among the plurality of theme content segments, the segment information of the video data and the relationship between the target segment and the video data comprises:

obtaining segment features of the plurality of theme content segments, a segment feature of a video segment, a global feature of the video segment and a global feature of the plurality of theme content segments by encoding the plurality of theme content segments, the relationship among the plurality of theme content segments, the segment information of the video data and the relationship between the target segment and the video data;

obtaining a code of the video segment by repeatedly performing encoding up to a set number of times based on the segment features of the plurality of theme content segments, the segment feature of the video segment, the global feature of the video segment, the global feature of the plurality of theme content segments and position information of the plurality of theme content segments; and determining an association degree between the video segment and the theme information based on the code of the video segment.

17. The electronic device of claim 16, wherein determining the association degree between the video segment and the theme information based on the code of the video segment comprises:

acquiring a determination result by performing conditional random field (CRF) determination on the code of the video segment; and determining the association degree between the video segment and the theme information based on the determination result.

18. The electronic device of claim 14, wherein acquiring the target segment of the video data to be extracted comprises:

obtaining a plurality of video segments of the video data to be extracted by dividing the video data based on a set interval; and taking at least one of the plurality of video segments of the video data as the target segment.

19. A non-transitory computer-readable storage medium having stored therein computer instructions that, when executed by a computer, cause the computer to perform a method for processing video data, comprising:

acquiring a target segment of video data to be extracted;

acquiring theme information to be extracted; and determining an association degree between the target segment and the theme information based on segment information of the video data and a relationship between the target segment and the video data;

wherein the association degree is determined by using a graph neural network.

20. The electronic device of claim 14, wherein the segment information comprises a feature of a video segment, and the electronic device further comprises:

a conversion module configured to convert each video frame in the video segment to a vector of a set dimension, and the vector of the set dimension comprises content information of a corresponding video frame; and a feature determining module configured to determine the feature of the video segment based on the vector of the set dimension.

\* \* \* \* \*